US011186370B2

(12) United States Patent
Taguchi

(10) Patent No.: US 11,186,370 B2
(45) Date of Patent: Nov. 30, 2021

(54) TOILET SEAT STRUCTURE FOR AIRCRAFT LAVATORY UNIT

(71) Applicant: The Yokohama Rubber Co., LTD., Tokyo (JP)

(72) Inventor: Yuji Taguchi, Hiratsuka (JP)

(73) Assignee: The Yokohama Rubber Co., LTD.

( * ) Notice: Subject to any disclaimer, the term of this patent is extended or adjusted under 35 U.S.C. 154(b) by 0 days.

(21) Appl. No.: 16/768,052

(22) PCT Filed: Nov. 27, 2018

(86) PCT No.: PCT/JP2018/043536
§ 371 (c)(1),
(2) Date: May 28, 2020

(87) PCT Pub. No.: WO2019/107345
PCT Pub. Date: Jun. 6, 2019

(65) Prior Publication Data
US 2021/0179270 A1    Jun. 17, 2021

(30) Foreign Application Priority Data
Nov. 28, 2017 (JP) .............................. JP2017-227683

(51) Int. Cl.
*B64D 11/02* (2006.01)
*A47K 13/04* (2006.01)
(Continued)

(52) U.S. Cl.
CPC .............. *B64D 11/02* (2013.01); *A47K 13/04* (2013.01); *A47K 13/14* (2013.01); *A47K 13/28* (2013.01)

(58) Field of Classification Search
CPC ........ B64D 11/02; A47K 13/04; A47K 13/14; A47K 13/28; A47K 13/307; A47K 11/00;
(Continued)

(56) References Cited

U.S. PATENT DOCUMENTS 1,972,076 A * 9/1934 Cross ........................ E03D 9/05
4/217
2,109,829 A * 3/1938 Roe ........................ A47K 13/04
4/248
(Continued)

FOREIGN PATENT DOCUMENTS

CN       1817289       8/2006
JP       S54-152551    10/1979
(Continued)

OTHER PUBLICATIONS

International Search Report for International Application No. PCT/JP2018/043536 dated Feb. 5, 2019, 3 pages, Japan.

*Primary Examiner* — J C Jacyna
(74) *Attorney, Agent, or Firm* — Thorpe North & Western

(57) ABSTRACT

Provided is a toilet seat structure for an aircraft lavatory unit. A toilet seat cushion block includes an inner and outer band-like bodies. The inner band-like body extends in a band-like shape at a section close to an inner circumference of a lower surface of a toilet seat, and the outer band-like body extends in a band-like shape at a section close to an outer circumference of the lower surface. Air communication passageways communicating with an inside and an outside of a bowl portion include: inner openings provided at an interval in the extension direction of the inner band-like body; an annular space between the inner and outer band-like bodies; and outer openings provided at an interval in the extension direction of the outer band-like body at sections of the outer band-like body, which are shifted from the inner openings in a circumferential direction of the toilet seat.

12 Claims, 18 Drawing Sheets

(51) Int. Cl.
*A47K 13/14* (2006.01)
*A47K 13/28* (2006.01)

(58) Field of Classification Search
CPC ...... B63B 29/14; B61D 35/00; B61D 35/005; B60R 15/04; B60D 3/00
See application file for complete search history.

(56) References Cited

U.S. PATENT DOCUMENTS

| | | | | |
|---|---|---|---|---|
| 2,240,094 A | * | 4/1941 | Foreman | E03D 9/052 4/217 |
| 4,094,023 A | * | 6/1978 | Smith | A47K 13/307 285/9.1 |
| 4,251,888 A | * | 2/1981 | Turner | E03D 9/052 4/213 |
| 5,345,617 A | * | 9/1994 | Jahner | A47K 13/307 4/217 |
| 6,298,500 B1 | * | 10/2001 | Sollami | A47K 13/307 4/217 |
| 6,959,458 B1 | | 11/2005 | Tsai | |
| 10,201,258 B1 | * | 2/2019 | Murphy | A47K 13/12 |
| 2005/0229301 A1 | * | 10/2005 | Hassan | A47K 13/302 4/420.4 |
| 2007/0294814 A1 | * | 12/2007 | Lee | E03D 9/052 4/348 |
| 2008/0216220 A1 | * | 9/2008 | Markaj | A47K 13/307 4/213 |
| 2008/0235858 A1 | * | 10/2008 | Schanz | A47K 13/24 4/236 |
| 2016/0242606 A1 | * | 8/2016 | Jackson | A47K 13/005 |

FOREIGN PATENT DOCUMENTS

| | | |
|---|---|---|
| JP | H05-154071 | 6/1993 |
| JP | 2010-053542 | 3/2010 |
| JP | 2016-169004 | 9/2016 |

\* cited by examiner

TOILET SEAT STRUCTURE FOR AIRCRAFT LAVATORY UNIT

TECHNICAL FIELD

The present technology relates to a toilet seat structure for an aircraft lavatory unit.

BACKGROUND ART

A toilet installed in an aircraft lavatory unit adopts a system of discharging waste to a tank by negative pressure. The shape of the toilet body is remarkably different from a domestic toilet body and includes a bowl portion for a residential building, has a simple bowl shape, and is made of metal or a resin.

Thus, the toilet installed in the aircraft lavatory unit includes a toilet body supported by a support portion above a floor and is provided with a shroud that covers the toilet body and the support portion.

The shroud includes: a peripheral wall portion that covers a periphery of the toilet body and the support portion; and a flange that has an annular plate shape and is placed on an upper end outer circumferential plate portion of the toilet body. The toilet seat is placed on the flange.

The aircraft lavatory unit adopts the system of sucking waste in the toilet body into a discharge pipe by negative pressure as described above. Thus, in a case where no measures are taken with respect to the negative pressure, when a user sits on the toilet seat, the negative pressure at the time of discharging waste acts on a human body seating portion to draw waste into the toilet body.

Thus, in the aircraft lavatory unit, it is demanded that air communication passageways communicating with the inside and the outside of the bowl portion be provided, by a predetermined area or more, between the flange of the shroud and the upper end outer circumferential plate portion of the bowl portion and between the toilet seat and the flange of the shroud.

In view of this, on a lower surface of the flange of the shroud, a plurality of shroud cushion blocks having a predetermined thickness are provided at an interval in a circumferential direction of the flange, and on a lower surface of the toilet seat, a plurality of toilet seat cushion blocks having a predetermined thickness are also provided at an interval in a circumferential direction of the toilet seat. Between those cushion blocks between the lower surface of the flange and the upper end outer circumferential plate portion and between the lower surface of the toilet seat and the flange, a plurality of air communication passageways communicating with the inside and the outside of the bowl portion are provided. In this manner, the relater-art aircraft lavatory unit prevents the application of negative pressure drawing the human body seating portion into the toilet body.

In recent years, the number of cases of toilet seat breakage has been increasing.

It is thought that breakage is caused by a user of the aircraft lavatory unit who places his or her foot on a toilet seat with a shoe on or a user or a cleaner who stands on a toilet seat with shoes on.

As described above, in the aircraft lavatory unit, in order to prevent the application of negative pressure to the human body seating portion, the plurality of air communication passageways communicating with the inside and the outside of the bowl portion are provided between the plurality of toilet seat cushion blocks having a predetermined thickness between the lower surface of the toilet seat and the flange.

Thus, in the act of placing a foot or standing on a section of the toilet seat between the toilet seat cushion blocks adjacent to each other, specifically, on a section of the toilet seat directly above the air communication passageway, it is thought that the load is directly applied to the toilet seat, which possibly causes the breakage.

SUMMARY

The present technology provides a toilet seat structure for an aircraft lavatory unit, which prevents the application of negative pressure drawing a human body seating portion into a toilet body and is advantageous in preventing the breakage of the toilet seat.

The present technology is for a toilet seat structure for an aircraft lavatory unit and includes: a toilet body including a bowl portion; support portion configured to support the toilet body above a floor; a shroud including a peripheral wall portion configured to cover a periphery of the toilet body and the support portion and a flange having an annular plate shape and being placed on an upper end outer circumferential plate portion of the bowl portion; a toilet seat having an annular shape with a width and being placed on the flange; a shroud cushion block being attached on a lower surface of the flange facing the upper end outer circumference plate portion while securing an air communication passageway configured to communicate with an inside and an outside of the bowl portion; and a toilet seat cushion block being attached on a lower surface of the toilet seat facing the flange while securing an air communication passageway configured to communicate with the inside and the outside of the bowl portion. The toilet seat cushion block has a band-like shape extending along a circumferential direction of the lower surface of the toilet seat and is positioned in substantially an entire area of the circumferential direction of the lower surface of the toilet seat while securing the air communication passageway at each of a plurality of sections at an interval in an extension direction of the toilet seat cushion block. In a state in which a section of the toilet seat directly above the air communication passageway is stepped on with a foot, in a plan view, the toilet seat cushion block is positioned inward of a contour of the foot.

Further, in the present technology, the toilet seat cushion block may include: an inner band-like body having a band-like shape and extending at a section close to an inner circumference of the lower surface of the toilet seat; and an outer band-like body having a band-like shape and extending at a section close to an outer circumference of the lower surface of the toilet seat, the section being away from the inner band-like body in a width direction orthogonal to the circumferential direction of the toilet seat, and the air communication passageway may include: a plurality of inner openings provided at an interval in an extension direction of the inner band-like body; an annular space between the inner band-like body and the outer band-like body; and a plurality of outer openings provided at an interval in an extension direction of the outer band-like body at sections of the outer band-like body, which are shifted from the plurality of inner openings in the circumferential direction of the toilet seat.

Further, in the present technology, at a freely selected position in the circumferential direction of the toilet seat, any one of the inner band-like body and the outer band-like body may be positioned in the width direction of the toilet seat.

Further, in the present technology, the toilet seat cushion block may include a plurality of divided band-like bodies being disposed at an interval in the circumferential direction of the toilet seat, the plurality of divided band-like bodies each may have an elongated shape having a width along the width direction of the toilet seat and a length being larger than the width and extending along the circumferential direction of the toilet seat, and an interval between the plurality of divided band-like bodies in the circumferential direction of the toilet seat may be smaller than the width.

Further, in the present technology, of the plurality of divided band-like bodies that face each other in the circumferential direction of the toilet seat, one end may be provided with a protrusion portion having a V-like shape, and another end may be provided with a recess portion having a V-like shape, the protrusion portion of another divided band-like body may be positioned inward of the recess portion of one divided band-like body of the plurality of divided band-like bodies adjacent to each other in the circumferential direction of the toilet seat, the air communication passageway may be formed to have a V-like shape between the protrusion portion and the recess portion, and in a length direction of the plurality of divided band-like bodies, a top portion of the protrusion portion may be positioned at a section shifted closer to the one divided band-like body with respect to top portions on both sides of the recess portion.

Further, in the present technology, at a freely selected position in the circumferential direction of the toilet seat, the plurality of divided band-like bodies may be positioned in the width direction of the toilet seat.

Further, in the present technology, recess/protrusion portions may be provided to the lower surface of the toilet seat and an upper surface of the toilet seat cushion block, which is attached to the lower surface, the recess/protrusion portions extending in the circumferential direction of the toilet seat and being engaged with each other.

Further, in the present technology, a recess portion extending in the circumferential direction of the toilet seat and opening downward may be provided in the lower surface of the toilet seat, and an upper portion of the toilet seat cushion block may be inserted therein, and the lower surface of the toilet seat may include a bottom surface of the recess portion.

According to the present technology, in a state in which the toilet seat is placed on the flange of the shroud through the intermediation of the toilet seat cushion block, in addition to the air communication passageway between the upper end circumferential plate portion of the bowl portion and the lower surface of the flange, the air communication passageway is provided between the lower surface of the toilet seat and the upper surface of the flange. With those air communication passageways, the space in the bowl portion communicates with the lavatory. Thus, even when negative pressure for discharging waste is applied in the bowl portion, the negative pressure for discharging waste is not applied to the human body seating portion.

Further, even when a user or a cleaner of the aircraft lavatory unit steps on a section of the toilet seat with a foot, which is positioned directly above the air communication passageway, the toilet seat cushion block is positioned in substantially the entire area in the circumferential direction of the toilet seat, and the toilet seat cushion block is positioned inward of the contour of the foot in a plan view. Thus, the load can be received directly by the toilet seat cushion block positioned inward of the contour of the foot, which is advantageous in preventing the breakage of the toilet seat.

Further, in the present technology, when the recess/protrusion portions are provided to the lower surface of the toilet seat and the upper surface of the toilet seat cushion block, or the recess portion is provided in the lower surface of the toilet seat, the positioning of the toilet seat cushion block with respect to the lower surface of the toilet seat can be facilitated, which is advantageous in facilitating attachment work for the toilet seat cushion block. Further, this is advantageous in preventing the peeling off of the toilet seat cushion block and improving the durability of the toilet seat cushion block.

DETAILED DESCRIPTION

Figure 1:
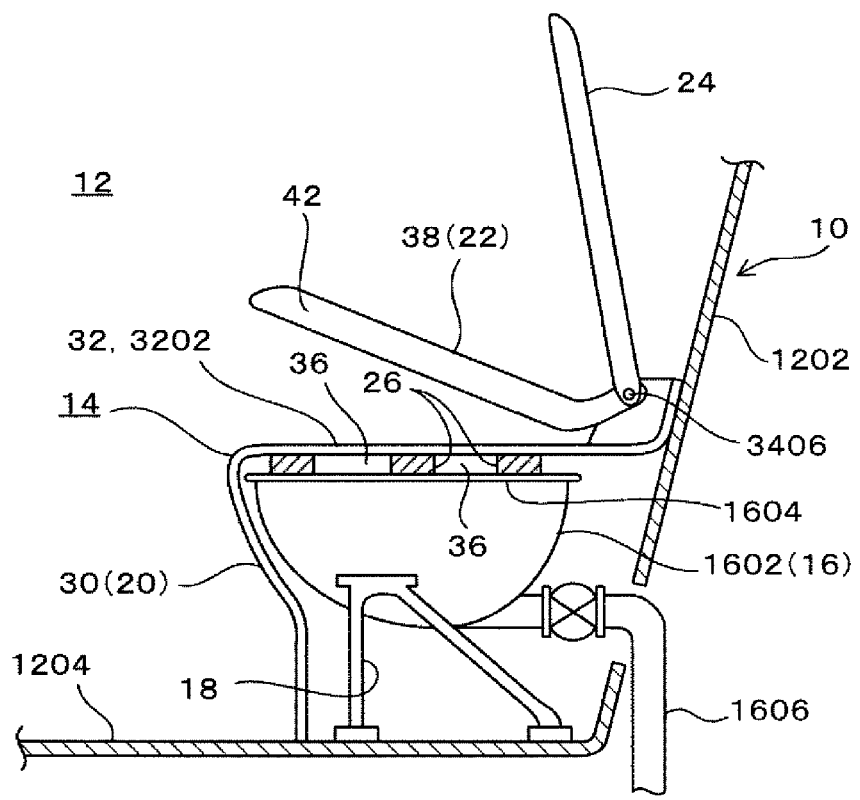
FIG. 1 is an explanatory diagram of a toilet in a side view, from which a part of a peripheral wall portion is removed.

Now, with reference to the drawings, embodiments of the present technology are described.

First Embodiment

First, a first embodiment is described with reference to FIGS. 1 to 6.

As illustrated in FIGS. 1 to 4, a toilet 14 installed in an aircraft lavatory unit 10 in a lavatory 12 includes a toilet body 16, a support portion 18, a shroud 20, a toilet seat 22, a lid 24, shroud cushion blocks 26, and a toilet seat cushion block 28.

The toilet body 16 is formed of metal and includes a bowl portion 1602 and an upper end outer circumferential plate portion 1604 on an upper end of the bowl portion 1602, which has an annular plate shape and extend outward of the bowl portion 1602, along an upper end outer circumference of the bowl portion 1602 with a constant width.

A discharge pipe 1606 that discharge waste in the bowl portion 1602 to the outside of the bowl portion 1602 by negative pressure is connected to a bottom portion of the bowl portion 1602.

The support portion 18 supports the toilet body 16 above a floor 1204 of the lavatory 12 and in the present embodiment, supports the toilet body 16 at a section close to a back wall 1202 of the lavatory 12.

Figure 4:
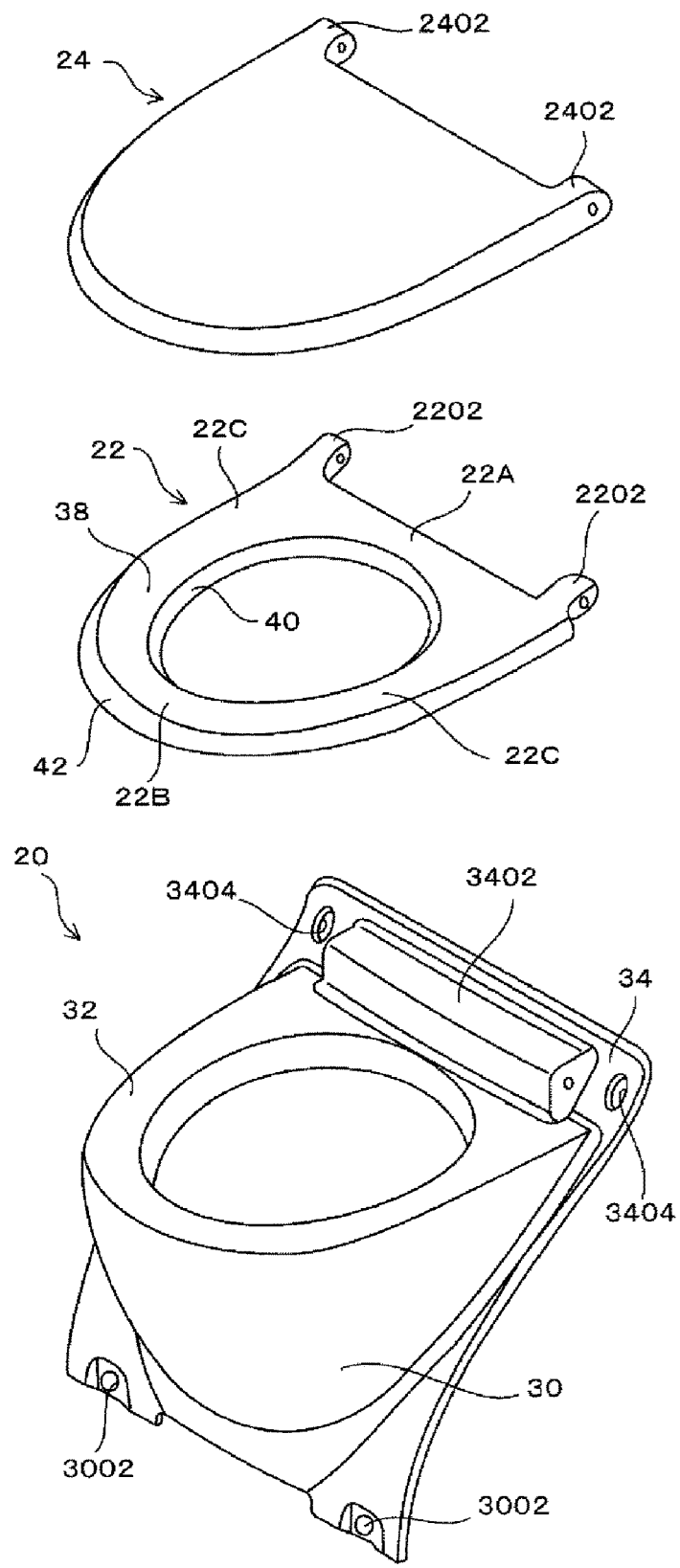
FIG. 4 is a perspective view of the lid, the toilet seat, and a shroud.

As illustrated in FIG. 4, the shroud 20 is formed of a synthetic resin and includes: a peripheral wall portion 30 that covers a periphery of the toilet body 16 and the support portion 18; a flange 32 that is connected to an upper end of the peripheral wall portion 30 and is placed on the upper end outer circumferential plate portion 1604; and an upper wall portion 34 that stands up from a rear end of the flange 32 positioned close to the back wall 1202. An attachment portion 3402 for the toilet seat 22 and the lid 24 is provided to the upper wall portion 34.

A lower end of the peripheral wall portion 30 is attached to attachment pieces 1206 of the floor 1204 of the lavatory 12, with bolts inserted through bolt insertion holes 3002 on both sides of the lower end of the peripheral wall portion 30, and the upper wall portion 34 is attached to the back wall 1202, with bolts inserted through bolt insertion holes 3404 on both sides of the upper wall portion 34. In this manner, the shroud 20 is installed in the lavatory 12.

Figure 2:
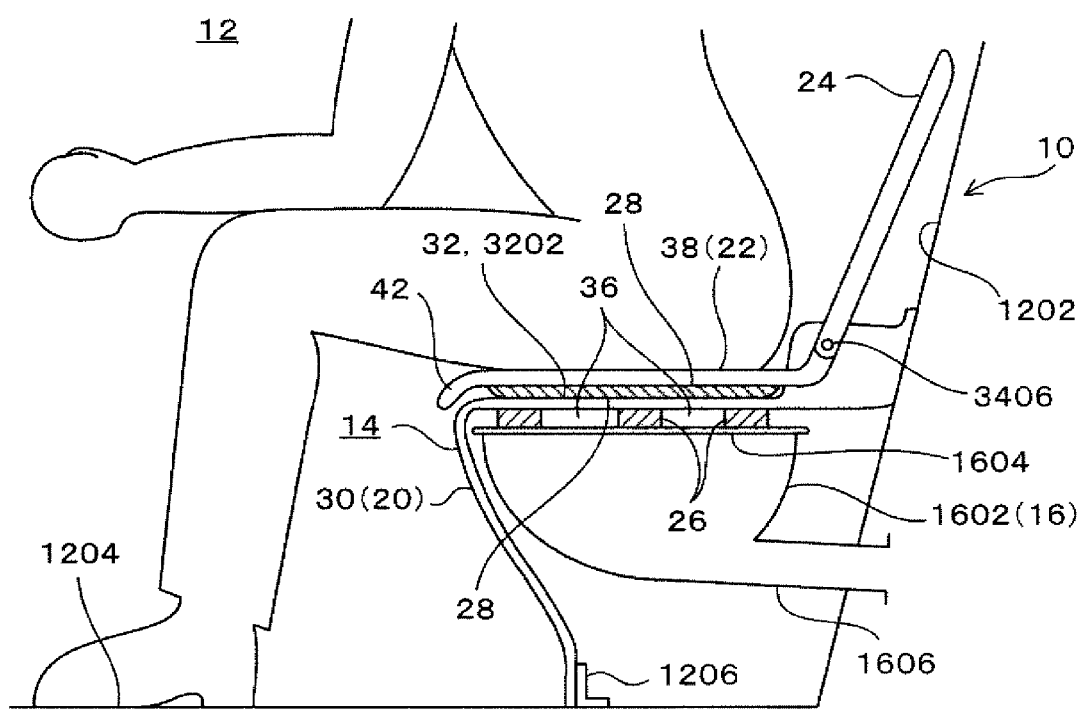
FIG. 2 is a diagram of the toilet in a state in which a user sits on the toilet seat in a side view, from which a part of the peripheral wall and an outer plate portion of a toilet seat are removed.

As illustrated in FIGS. 1 and 2, the plurality of cylindrical shroud cushion blocks 26 are attached on a lower surface of the flange 32 at an interval in a circumferential direction of the flange 32.

The shroud cushion blocks 26 have a predetermined thickness and are placed on the upper end outer circumferential plate portion 1604. Between the cushion blocks 26 between the upper end outer circumferential plate portion 1604 of the bowl portion 1602 and the lower surface of the flange 32, a plurality of air communication passageways 36 communicating with the inside and the outside of the bowl portion 1602 are formed.

As illustrated in FIG. 4, both the toilet seat 22 and the lid 24 are formed of a synthetic resin and respectively include forked portions 2202 and 2402 that are attached to the attachment portion 3402 in a swingable manner through the intermediation of a support shaft 3406 (see FIGS. 1 and 2).

The toilet seat 22 includes a rear portion 22A positioned close to the attachment portion 3402 of the shroud 20, a front portion 22B positioned on the opposite side, and front-rear intermediate portions 22C on both right and left sides between the front portion 22B and the rear portion 22A.

Figure 5:
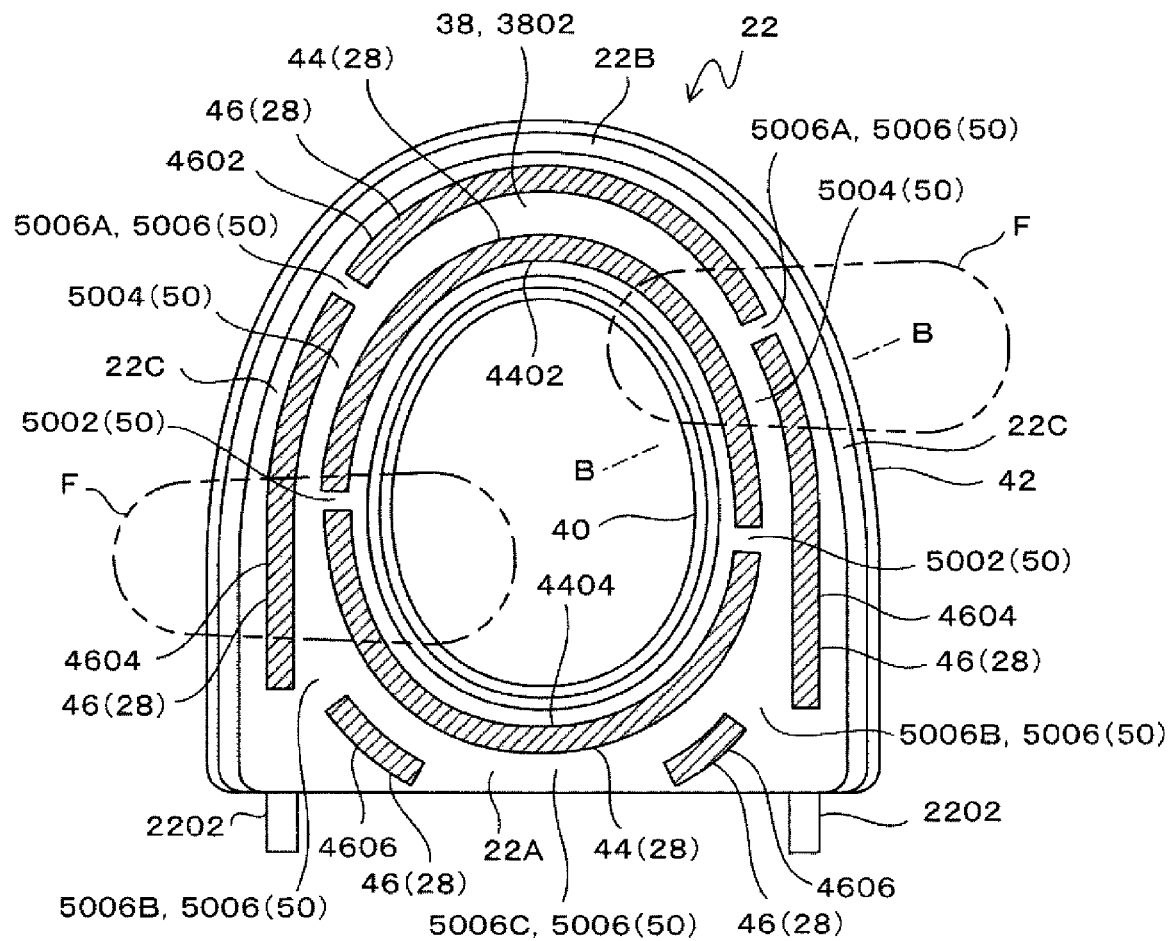
FIG. 5 is a diagram of a toilet seat according to a first embodiment, which is seen from below.
Figure 6:
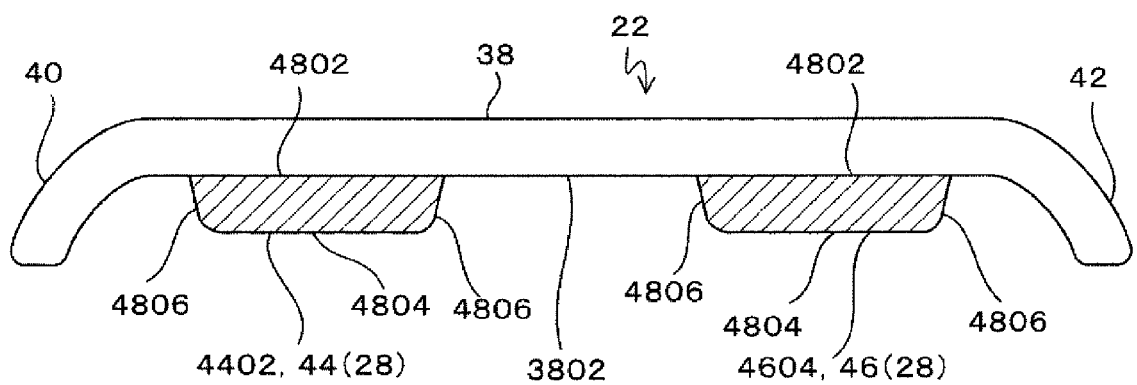
FIG. 6 is a cross-sectional view taken along B-B of FIG. 5.

As illustrated in FIGS. 5 and 6, the toilet seat 22 includes: a body plate portion 38 having an annular plate shape and extending annularly with a width; an inner plate portion 40 bent downward from an inner circumference of the body plate portion 38; and an outer plate portion 42 bent downward from an outer circumference of the body plate portion 38.

As indicated with the hatched portions in FIG. 5, the toilet seat cushion block 28 includes an inner band-like body 44 and an outer band-like body 46, which have a band-like shape extending in a circumferential direction of a lower surface 3802 of the body plate portion 38 of the toilet seat 22, and is positioned in the entire area in the circumferential direction of the body plate portion 38 of the toilet seat 22.

The toilet seat cushion block 28 is placed on an upper surface 3202 of the flange 32 (see FIGS. 1 and 2), and thus the toilet seat 22 is disposed on the flange 32.

For the toilet seat cushion block 28, a material that suppresses sound generated by the rattling of the toilet seat 22 due to vibration during flight and sound generated by lowering the toilet seat 22 is used. For example, various materials such as rubber and a synthetic resin material that are known in the related art may be used.

The inner band-like body 44 annularly extends with a uniform width at a section close to the inner circumference of the lower surface 3802 of the body plate portion 38 of the toilet seat 22.

The inner band-like body 44 includes an inner front band-like body 4402 and an inner rear band-like body 4404 separated away from the inner front band-like body 4402.

The inner front band-like body 4402 extends close to the front portion 22B of the toilet seat 22, and the inner rear band-like body 4404 extends close to the rear portion 22A of the toilet seat 22.

The outer band-like body 46 extends with a uniform width at a section close to the outer circumference of the lower surface 3802 of the body plate portion 38, which is away from the inner band-like body 44 in a width direction orthogonal to the circumferential direction of the toilet seat 22.

The outer band-like body 46 includes an outer front band-like body 4602, a pair of outer rear band-like bodies 4604, and a pair of outer rear-end band-like bodies 4606, which are separated away from one another.

The outer front band-like body 4602 extends close to the front portion 22B of the toilet seat 22, the outer rear band-like bodies 4604 extend from sections close to the front portion 22B of the toilet seat 22 to the rear portion 22A, and the outer rear-end band-like bodies 4606 extend from sections that are obliquely away from rear ends of the outer rear band-like bodies 4604.

In the present embodiment, the inner band-like body 44 and the outer band-like body 46 are obtained by cutting a single elongated band-like body as appropriate and performing bonding to the lower surface 3802 of the body plate portion 38 with an adhesive. With this, the number of components is reduced, and thus cost reduction is achieved. Therefore, in the present embodiment, the width of the inner band-like body 44 and the width of the outer band-like body 46 are the same.

As illustrated in FIG. 6, the inner band-like body 44 and the outer band-like body 46 each include: a flat upper surface 4802, which is attached to the lower surface 3802 of the body plate portion 38 with an adhesive; a flat lower surface 4804; and inclined surfaces 4806 provided to both side portions in the width direction. Note that the inner band-like body 44 and the outer band-like body 46 each have a freely-selected cross-sectional shape formed of, for example, a curved surface protruding downward.

Air communication passageways 50 communicating with the inside and the outside of the bowl portion 1602 are provided at a plurality of sections at an interval in the circumferential direction of the toilet seat cushion block 28.

In the present embodiment, the air communication passageways 50 include: a plurality of inner openings 5002 provided at an interval in the extension direction of the inner band-like body 44; an annular space 5004 between the inner band-like body 44 and the outer band-like body 46; and a plurality of outer openings 5006 provided at an interval in the extension direction of the outer band-like body 46 at sections of the outer band-like body 46, which are shifted from the inner openings 5002 in the circumferential direction of the toilet seat 22.

In the present embodiment, the inner openings 5002 are provided between both ends of the inner front band-like body 4402 and both ends of the inner rear band-like body 4404. Therefore, the inner openings 5002 are not provided in the front portion 22B of the toilet seat 22 and the rear portion 22A.

The outer openings 5006 include outer front openings 5006A, outer rear openings 5006B, and an outer opening 5006C for the attachment portion.

The outer front openings 5006A are provided between both ends of the outer front band-like body 4602 and ends of the pair of outer rear band-like bodies 4604, and thus are formed at sections of the outer band-like body 46 on both right and left sides of the front portion 22B of the toilet seat 22.

The outer rear openings 5006B are provided between the ends of the pair of outer rear band-like bodies 4604 and ends of the pair of outer rear-end band-like bodies 4606.

The outer opening 5006C for the attachment portion is provided between the ends of the pair of outer rear-end band-like bodies 4606, and a dimension of the outer opening 5006C for the attachment portion, which is along the circumferential direction of the toilet seat 22, is formed to be larger than the outer front openings 5006A and the outer rear openings 5006B.

Therefore, the outer front openings 5006A, the outer rear openings 5006B, and the outer opening 5006C for the attachment portion are shifted from the inner openings 5002 in the circumferential direction of the toilet seat 22, and thus a part of the toilet seat cushion block 28 is always positioned in a width direction of the toilet seat 22 at any position in the circumferential direction of the toilet seat 22.

With this, in a state in which a section of the toilet seat 22 directly above the air communication passageway 50 is stepped on with a foot, in a plan view, the toilet seat cushion block 28 is positioned inward of a contour of the foot.

According to the present embodiment, in a state in which the toilet seat 22 is placed on the flange 32 of the shroud 20 through the intermediation of the toilet seat cushion block 28, the air communication passageways 50 are provided between the lower surface of the toilet seat 22 (the lower surface 3802 of the body plate portion 38) and the upper surface 3202 of the flange 32, in addition to the air communication passageways 36 between the upper end outer circumferential plate portion 1604 of the bowl portion 1602 and the lower surface of the flange 32.

In other words, the space in the bowl portion 1602 communicates with the lavatory 12 through the air communication passageways 36 and 50.

Thus, even when negative pressure for discharging waste is applied in the toilet body 16, the negative pressure for discharging waste is not applied to the human body seating portion.

Figure 3:
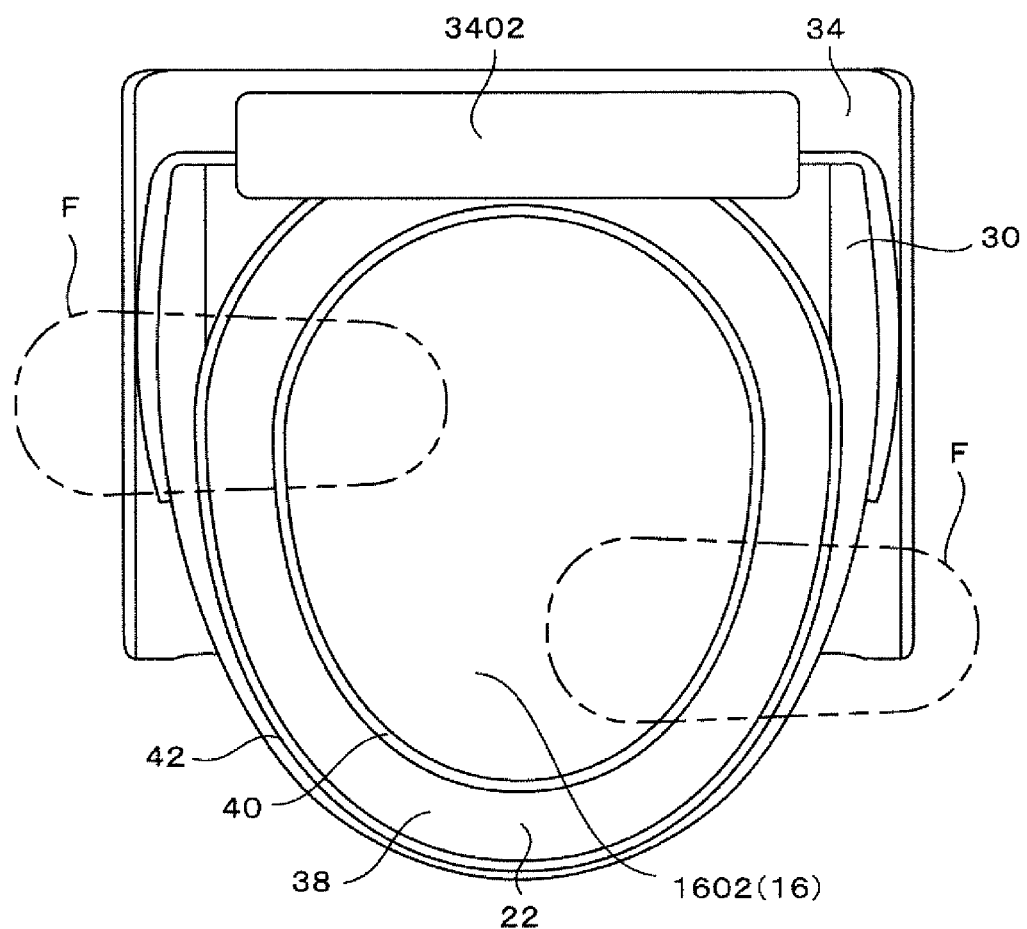
FIG. 3 is a plan view of the toilet from which a lid is removed.

Further, even when a user of the aircraft lavatory unit 10 places his or her foot on a section of the toilet seat 22 directly above the air communication passageway 50, or when a user or a cleaner stands up on sections of the toilet seat 22 directly above the air communication passageways 50, as the shoes are indicated with reference symbols F in FIGS. 3 and 5, specifically, a user or a cleaner steps on the sections of the toilet seat 22 directly above the air communication passageways 50 with his or her feet, the toilet seat cushion block 28 has a band-like shape and is positioned in substantially the entire area in the circumferential direction of the toilet seat 22, and hence, in a plan view, the part corresponding to the inner band-like body 44, the part corresponding to the outer band-like body 46, or the parts corresponding to both the inner band-like body 44 and the outer band-like body 46 are positioned inward of the contour of the foot (that is, the contour of the shoe F). With this, the load can be received directly by the part corresponding to the toilet seat cushion block 28, which is advantageous in preventing the breakage of the toilet seat 22.

Next, modified examples of the first embodiment are described with reference to FIGS. 7 and 8.

In the present modified example, on the lower surface 3802 of the toilet seat 22 and the upper surface 4802 of the toilet seat cushion block 28, which is attached to the lower surface 3802, recess/protrusion portions 52, which extend in the circumferential direction of the toilet seat 22 and are engaged with each other, are provided, and the inner band-like body 44 and the outer band-like body 46 forming the toilet seat cushion block 28 are integrally molded with a die.

Figure 7:
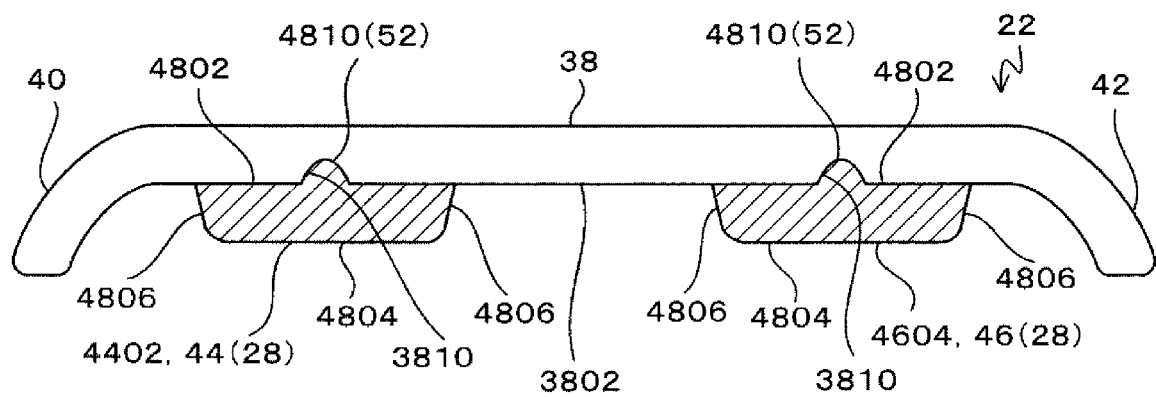
FIG. 7 is an explanatory diagram of a modified example of the first embodiment.

In the modified example illustrated in FIG. 7, as the recess/protrusion portions 52, recessed grooves 3810, which extend along the circumferential direction of the body plate portion 38, are provided in sections of the lower surface 3802 of the body plate portion 38 to which the inner band-like body 44 and the outer band-like body 46 are attached, and protrusions 4810, which are engageable with the recessed grooves 3810 and extend in the extension direction of the band-like bodies 44 and 46, are further provided on the upper surfaces of the inner band-like body 44 and the outer band-like body 46.

Figure 8:
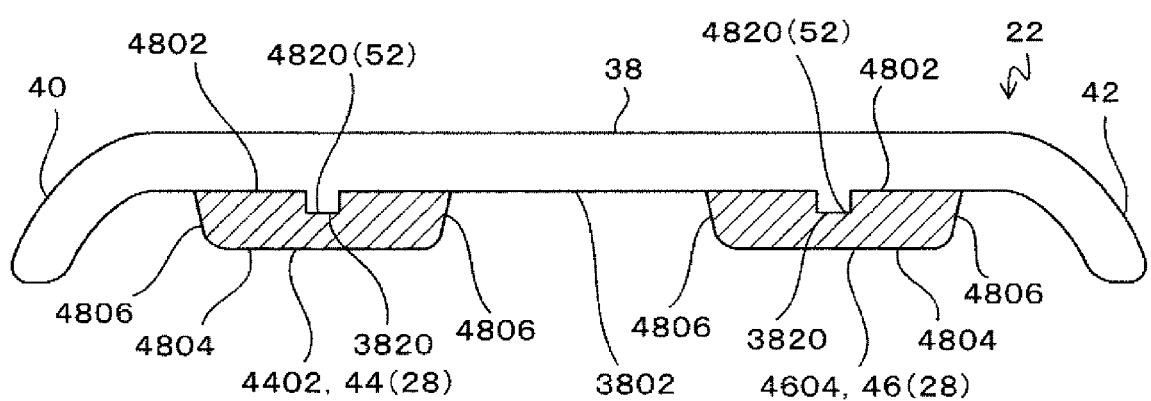
FIG. 8 is an explanatory diagram of a modified example of the first embodiment.

Further, in the modified example illustrated in FIG. 8, as the recess/protrusion portions 52, protrusions 3820, which extend along the circumferential direction of the body plate portion 38, are provided on the lower surface 3802 of the body plate portion 38, and recessed grooves 4820, which are engageable with the protrusions 3820 and extend in the extension direction of the toilet seat cushion block 28, are provided in the upper surfaces of the inner band-like body 44 and the outer band-like body 46.

Figure 9:
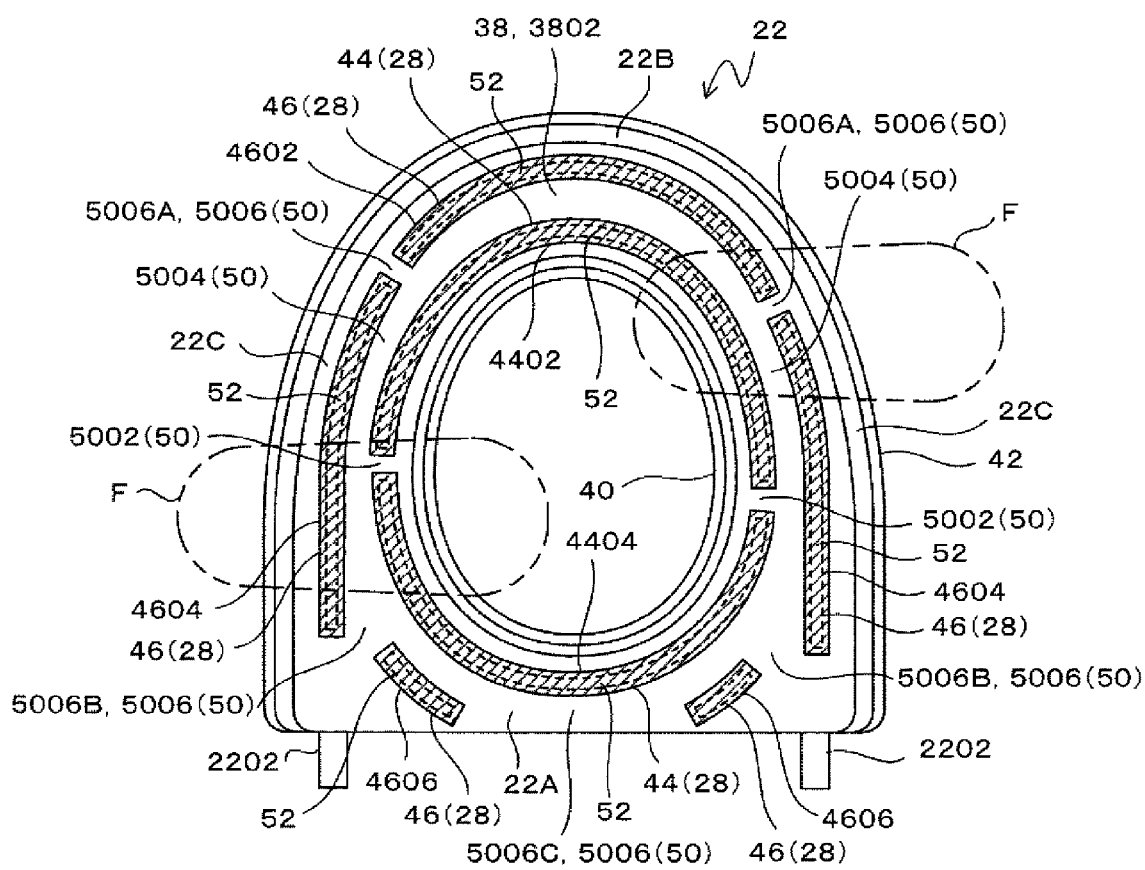
FIG. 9 is an explanatory diagram of a toilet seat according to the modified example of the first embodiment, which is seen from below.

In this case, as illustrated in FIG. 9, in a state in which the inner band-like body 44 and the outer band-like body 46 are attached to the lower surface 3802 of the body plate portion 38, in a plan view, the recess/protrusion portions 52 are formed to have a dimension positioned inward of the contours of the inner band-like body 44 and the outer band-like body 46, in other words, a dimension hidden in the inner band-like body 44 and the outer band-like body 46.

According to this modified example, when the recessed grooves 3810, 4820 and the protrusions 4810, 3820 are engaged with each other, the positioning of the inner band-like body 44 and the outer band-like body 46 with respect to the lower surface 3802 of the body plate portion 38 (positioning of the toilet seat 22 in the circumferential direction and the width direction) can be facilitated, which is advantageous in facilitating attachment work for the inner band-like body 44 and the outer band-like body 46.

Further, the adhesion areas of the inner band-like body 44 and the outer band-like body 46 with respect to the lower surface 3802 of the body plate portion 38 of the toilet seat 22 can be increased, and the structure in which the parts of the inner band-like body 44 and the outer band-like body 46 and the parts of the toilet seat 22 are mechanically engaged with each other is provided. Thus, at the time of stepping on the toilet seat 22 with a foot or sitting on the toilet seat 22, when a load is applied to the toilet seat 22 in the width direction in a state of sitting on the toilet seat 22, the load can also be received by, in addition to the adhesion surfaces between the body plate portion 38 and the inner band-like body 44 and the outer band-like body 46, the parts of the inner band-like body 44 and the outer band-like body 46, and the parts of the toilet seat 22, which are mechanically engaged with each other, which is advantageous in preventing the peeling off of the inner band-like body 44 and the outer band-like body 46 and improving the durability of the toilet seat cushion block 28.

Next, another modified example of the first embodiment is described with reference to FIG. 10.

In this modified example, the inner band-like body 44 and the outer band-like body 46 forming the toilet seat cushion block 28 are also integrally molded with a die.

Figure 10:
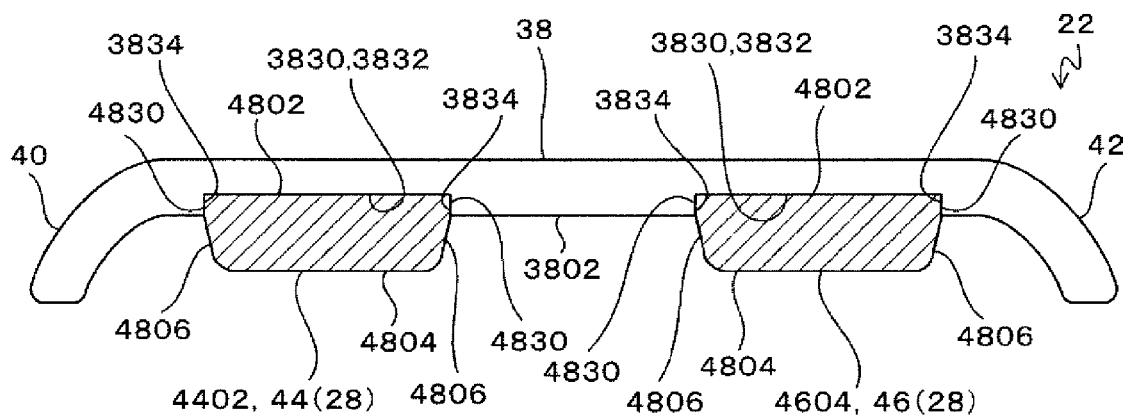
FIG. 10 is an explanatory diagram of another modified example of the first embodiment.

In the modified example illustrated in FIG. 10, in the sections of the lower surface 3802 of the body plate portion 38 to which the inner band-like body 44 and the outer band-like body 46 are attached, recess portions 3830 extending along the circumferential direction of the body plate portion 38 and opening downward are provided, and the upper part of the inner band-like body 44 and the upper part of the outer band-like body 46 are inserted therein.

The recess portions 3830 are formed to have a dimension that allows the upper part of the inner band-like body 44 and the upper part of the outer band-like body 46 to be fitted therein without rattling.

In this modified example, the lower surface 3802 of the toilet seat 22 includes bottom surfaces 3832 of the recess portions 3830.

Further, the upper surfaces 4802 of the inner band-like body 44 and the upper part of the outer band-like body 46 are attached to the bottom surfaces 3832 of the recess portions 3830 with an adhesive, and side surfaces 4830 on both sides of the inner band-like body 44 and the upper part of the outer band-like body 46 are attached to side surfaces 3834 of the recess portions 3830 with an adhesive.

According to this modified example, when the upper part of the inner band-like body 44 and the upper part of the outer band-like body 46 are inserted in the recess portions 3830, the positioning of the inner band-like body 44 and the outer band-like body 46 with respect to the lower surface 3802 of the body plate portion 38 can also be facilitated, which is advantageous in facilitating attachment work for the inner band-like body 44 and the outer band-like body 46.

Further, the adhesion areas of the inner band-like body 44 and the outer band-like body 46 with respect to the lower surface 3802 of the body plate portion 38 of the toilet seat 22 can be increased, and the structure in which the parts of the inner band-like body 44 and the outer band-like body 46 and the parts of the toilet seat 22 are mechanically engaged with each other is provided. Thus, at the time of stepping on the toilet seat 22 with a foot or sitting on the toilet seat 22, when a load is applied to the toilet seat 22 in the width direction in a state of sitting on the toilet seat 22, the load can also be received by, in addition to the adhesion surfaces between the body plate portion 38 and the inner band-like body 44 and the outer band-like body 46, the part of the inner band-like body 44, the part of the outer band-like body 46, and the parts of the toilet seat 22, which are mechanically engaged with each other, which is advantageous in preventing the peeling off of the toilet seat cushion block 28 and improving the durability of the toilet seat cushion block 28.

Note that, in the modified examples in FIGS. 7 to 10, a case where the inner band-like body 44 and the outer band-like body 46 forming the toilet seat cushion block 28 are integrally molded with a die is described. When the recess/protrusion portions 52 illustrated in FIGS. 7 to 9 and the recess portions 3830 in FIG. 10 are formed continuously in the circumferential direction of the toilet seat 22, a single elongated band-like body forming the inner band-like body 44 and the outer band-like body 46 may be cut as appropriate and may be attached to the lower surface 3802 of the body plate portion 38 with an adhesive.

In this case, although the recess/protrusion portions 52 illustrated in FIGS. 7 to 9 and the recess portions 3830 in FIG. 10 are exposed to the lower surface 3802 of the toilet seat 22 at the parts corresponding to the inner openings 5002 and the outer openings 5006, the positioning of the inner band-like body 44 and the outer band-like body 46 in the width direction of the toilet seat 22 can be facilitated, which is advantageous in facilitating attachment work for the inner band-like body 44 and the outer band-like body 46.

Figure 11:
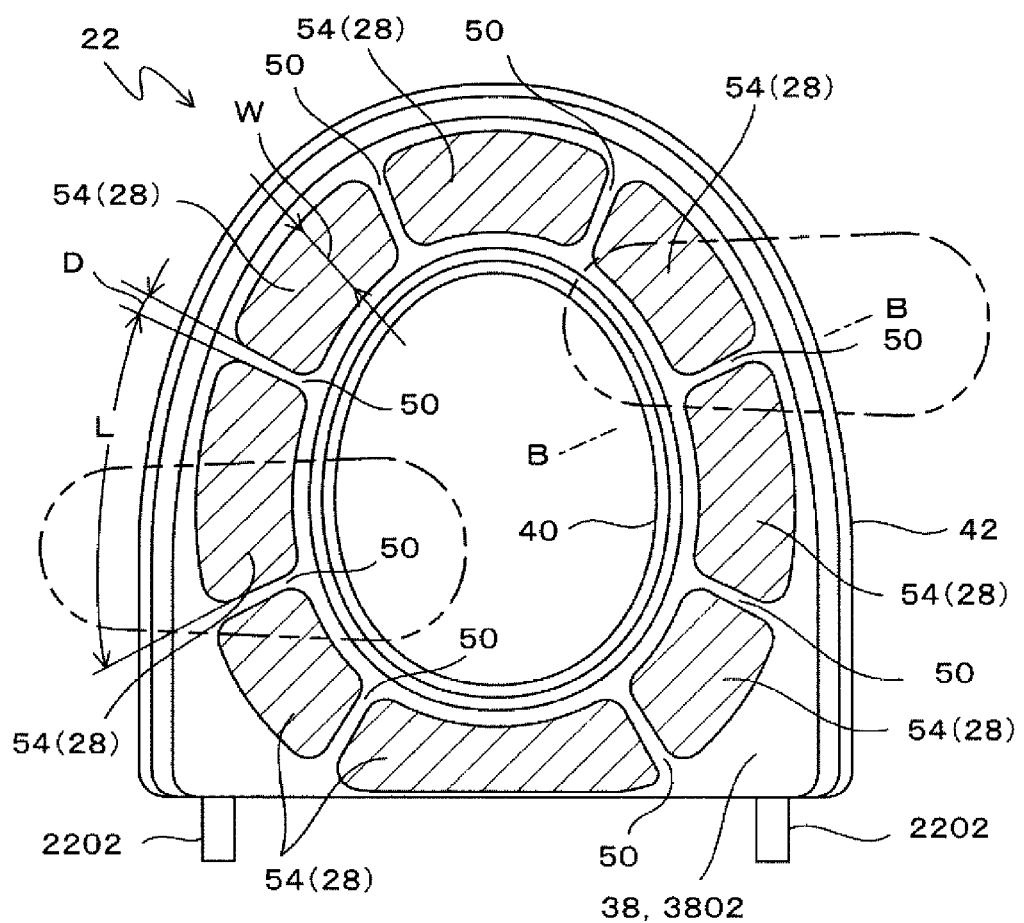
FIG. 11 is a diagram of a toilet seat according to a second embodiment, which is seen from below.
Figure 12:
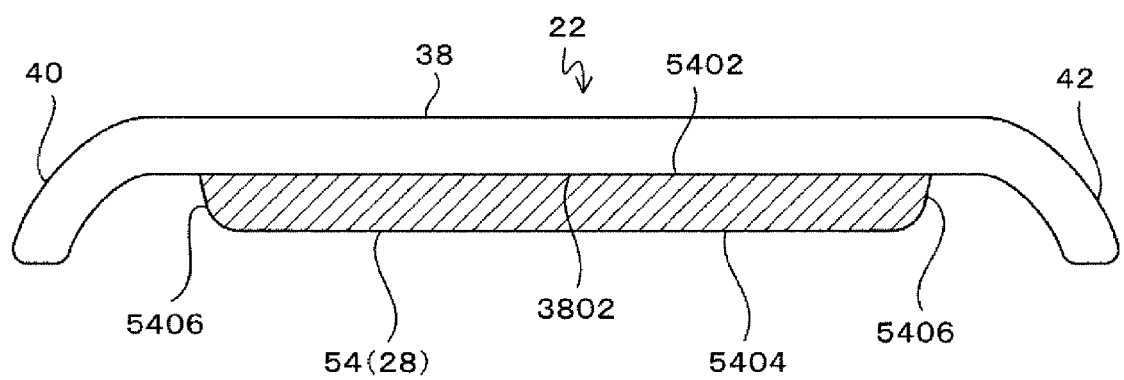
FIG. 12 is a cross-sectional view taken along B-B of FIG. 11.

Next, a second embodiment is described with reference to FIGS. 11 and 12.

The toilet seat cushion block 28 includes a plurality of divided band-like bodies 54 disposed on the lower surface 3802 of the body plate portion 38 of the toilet seat 22 at an interval in the circumferential direction.

The divided band-like bodies 54 are integrally molded with a die.

The divided band-like bodies 54 each have a band-like shape, which extends along the circumferential direction of the lower surface 3802 of the body plate portion 38 of the toilet seat 22, and each have an elongated shape having a length L along the circumferential direction of the toilet seat 22 and a width W smaller than the length L in a direction orthogonal to the length L.

An interval D between the plurality of divided band-like bodies 54 in the circumferential direction of the toilet seat 22 is formed to be smaller than the width W. Therefore, the toilet seat cushion block 28 is positioned in substantially the entire area of the lower surface 3802 of the toilet seat 22 in the circumferential direction.

The divided band-like body 54 has an elongated cross-sectional shape cut along a plane orthogonal to the extension direction. As illustrated in FIG. 12, the divided band-like body 54 includes: a flat upper surface 5402, which is attached to the lower surface 3802 of the body plate portion 38 with an adhesive; a flat lower surface 5404; and an inclined surface 5406, which connects the entire circumference around the upper surface 5402 and the entire circumference around the lower surface 5404 to each other.

In the second embodiment, in a state in which the toilet seat 22 is placed on the flange 32 of the shroud 20 through the intermediation of the toilet seat cushion block 28, spaces between ends of the divided band-like body 54, which are adjacent to each other in the circumferential direction of the toilet seat 22, function as the air communication passageways 50, through which the space in the bowl portion 1602 communicates with the lavatory 12, and the air communication passageways 50 extend in the width direction of the toilet seat 22.

Similarly to the first embodiment, according to the second embodiment, the air communication passageways 50 are also provided between the lower surface 3802 of the toilet seat 22 and the upper surface 3202 of the flange 32, in addition to the air communication passageways 36 between the upper end outer circumferential plate portion 1604 of the bowl portion 1602 and the lower surface of the flange 32. Thus, even when negative pressure for discharging waste is applied in the toilet body 16, the negative pressure for discharging waste is not applied to the human body seating portion.

Further, even when a user and a cleaner steps on a section of the toilet seat 22 directly above the air communication passageway 50, the toilet seat cushion block 28 has a band-like shape and is positioned in substantially the entire area in the circumferential direction of the toilet seat 22, and hence, in a plan view, the part of the toilet seat cushion block 28 is positioned inward of the contour of the foot (that is, the contour of the shoe F). With this, the load can be received directly by the part corresponding to the toilet seat cushion block 28, which is advantageous in preventing the breakage of the toilet seat 22.

Figure 13:
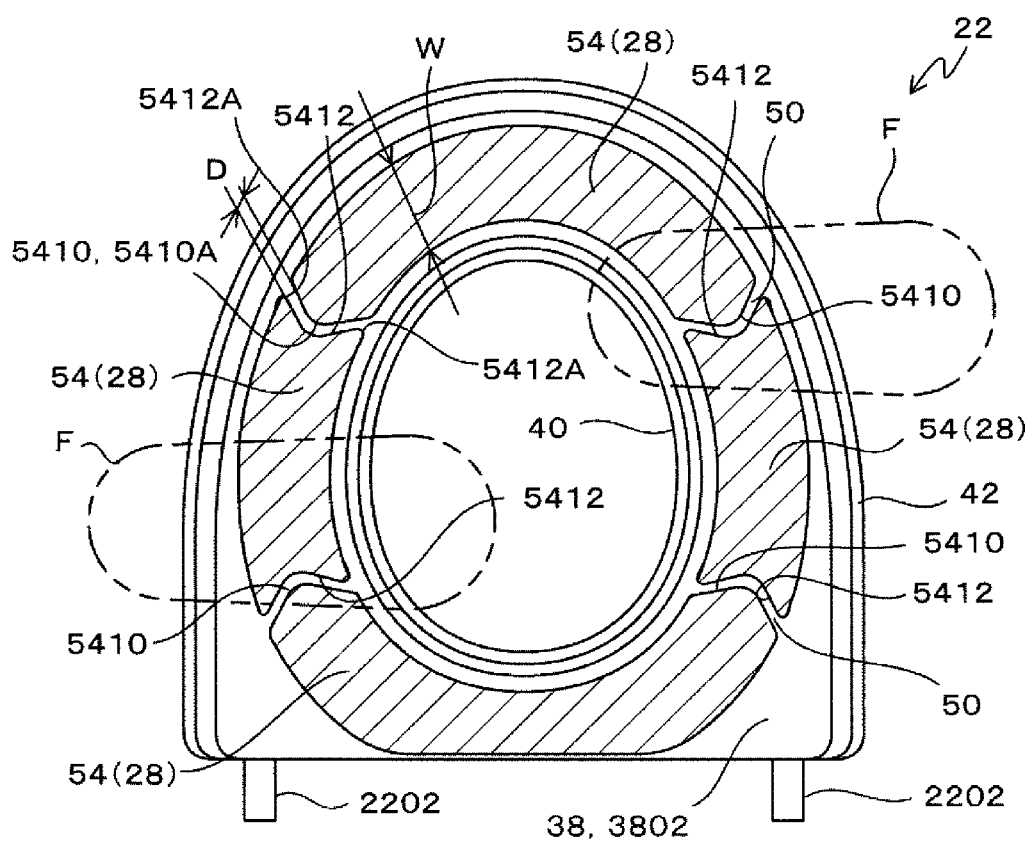
FIG. 13 is a diagram of a toilet seat according to a third embodiment, which is seen from below.

Next, a third embodiment is described with reference to FIG. 13.

The third embodiment is a modified example of the second embodiment. V-like protrusion portion 5410 and V-like recess portion 5412, which face each other in the circumferential direction of the toilet seat 22, are provided to an end of one of the divided band-like bodies 54 and an end of another of the divided band-like bodies 54, respectively.

Further, in a state in which the divided band-like bodies 54 are attached to the lower surface 3802 of the toilet seat 22, the interval D between the protrusion portions 5410 and the recess portions 5412 of the plurality of divided band-like bodies 54 in the circumferential direction of the toilet seat 22 is formed to be smaller than the width W of the divided band-like bodies 54. Therefore, the toilet seat cushion block 28 is positioned in substantially the entire area of the lower surface 3802 of the toilet seat 22 in the circumferential direction.

Of the divided band-like bodies 54 adjacent to each other in the circumferential direction of the toilet seat 22, the protrusion portion 5410 of another of the divided band-like bodies 54 is positioned inward of the recess portion 5412 of one of the divided band-like bodies 54. Thus, the air communication passageways 50 are formed to have a V-like shape between the protrusion portions and the recess portion 5412.

Further, in the length direction of the divided band-like body 54, a top portion 5410A of the protrusion portion 5410 is positioned at a section shifted closer to the one of the divided band-like bodies 54 with respect to top portions 5412A on both sides of the recess portion 5412.

Therefore, a part of the toilet seat cushion block 28 is always positioned in the width direction of the toilet seat 22 at any position in the circumferential direction of the toilet seat 22. Thus, even when a user or a cleaner steps on a section of the toilet seat 22 directly above the air communication passageway 50, in a plan view, the part of the toilet seat cushion block 28 is positioned inward of the contour of the foot (that is, the contour of the shoe F).

Similarly to the first embodiment, with the third embodiment as described above, negative pressure for discharging waste is not applied to the human body seating portion. Further, this is advantageous in preventing the breakage of the toilet seat 22.

Next, modified examples of the second embodiment and the third embodiment are described with reference to FIGS. 14 and 15.

In the present modified example, recess/protrusion portions 56, which extend in the circumferential direction of the toilet seat 22 and are engaged with each other, are provided to the lower surface 3802 of the toilet seat 22 and the upper surface of the toilet seat cushion block 28 (the divided band-like bodies 54), which is attached to the lower surface.

Figure 14:
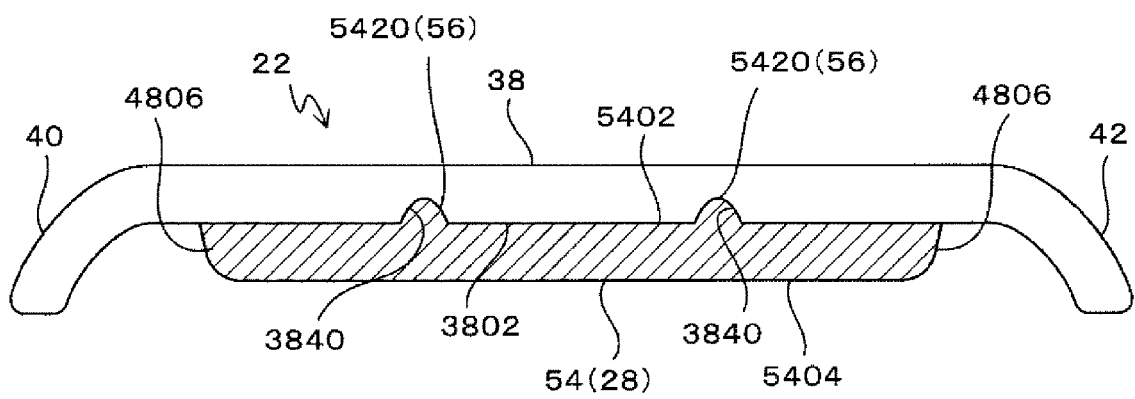
FIG. 14 is an explanatory diagram of a modified example of the second embodiment and the third embodiment.

In the modified example illustrated in FIG. 14, as the recess/protrusion portions 56, recessed grooves 3840, which extend along the circumferential direction of the body plate portion 38, are provided in sections of the lower surface 3802 of the body plate portion 38 to which the divided band-like bodies 54 are attached, and protrusions 5420, which are engageable with the recessed groove 3840 and extend in the extension direction of the toilet seat cushion block 28, are provided to the upper surfaces of the divided band-like bodies 54.

Figure 15:
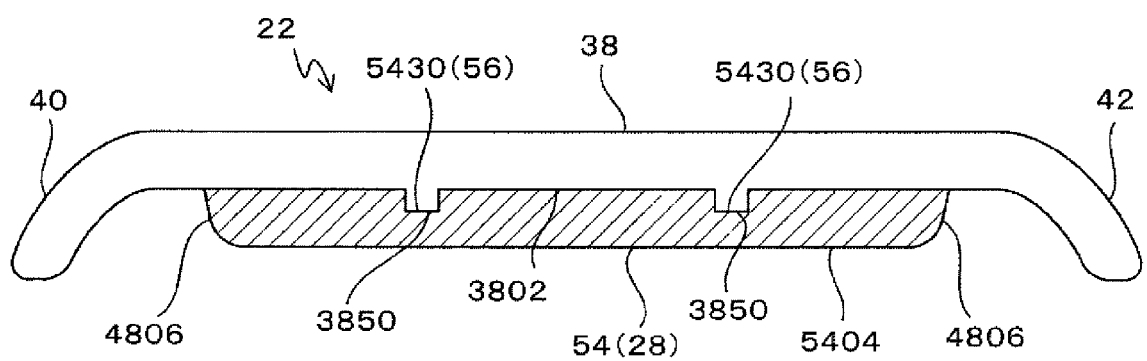
FIG. 15 is an explanatory diagram of a modified example of the second embodiment and the third embodiment.

Further, in the modified example illustrated in FIG. 15, as the recess/protrusion portions 56, protrusions 3850, which extend along the circumferential direction of the body plate portion 38, are provided, at an interval in the width direction of the body plate portion 38, to the sections of the lower surface 3802 of the body plate portion 38 to which the divided band-like bodies 54 are attached, and recessed grooves 5430, which are engageable with the protrusions 3850 and extend in the extension direction of the divided band-like bodies 54, are provided in lower surfaces of the divided band-like bodies 54.

Figure 16:
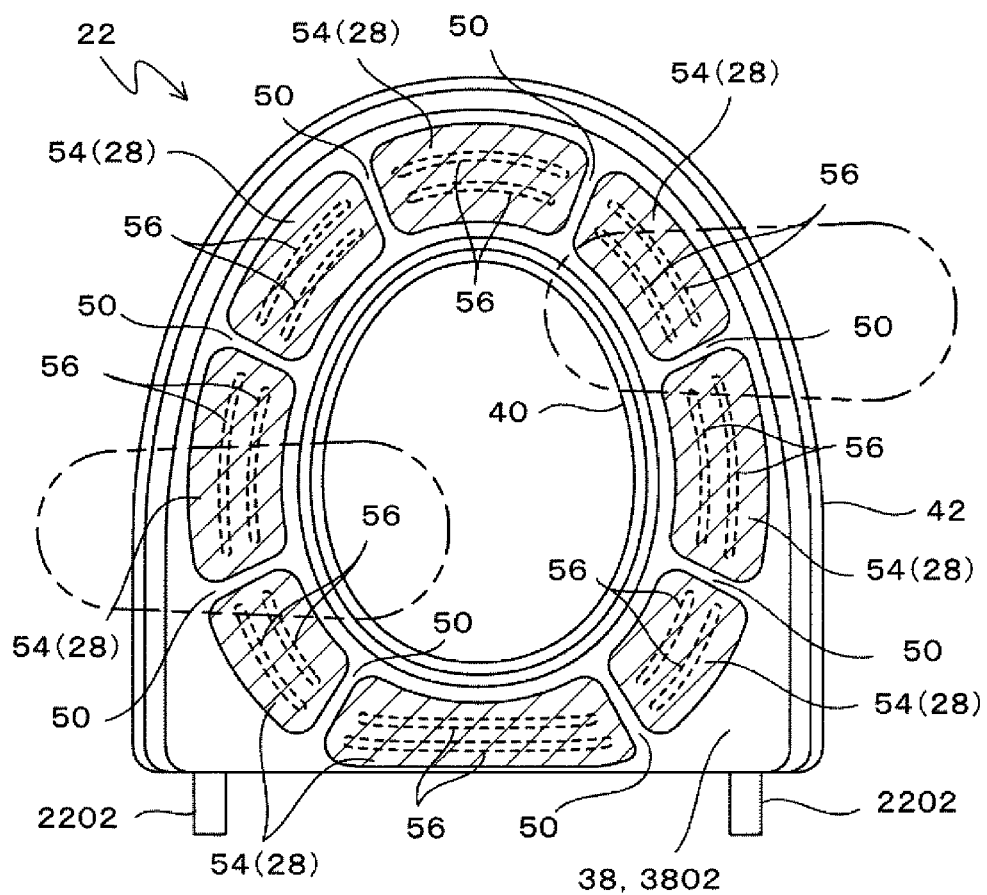
FIG. 16 is an explanatory diagram of a toilet seat according to the modified example of the second embodiment, which is seen from below.
Figure 17:
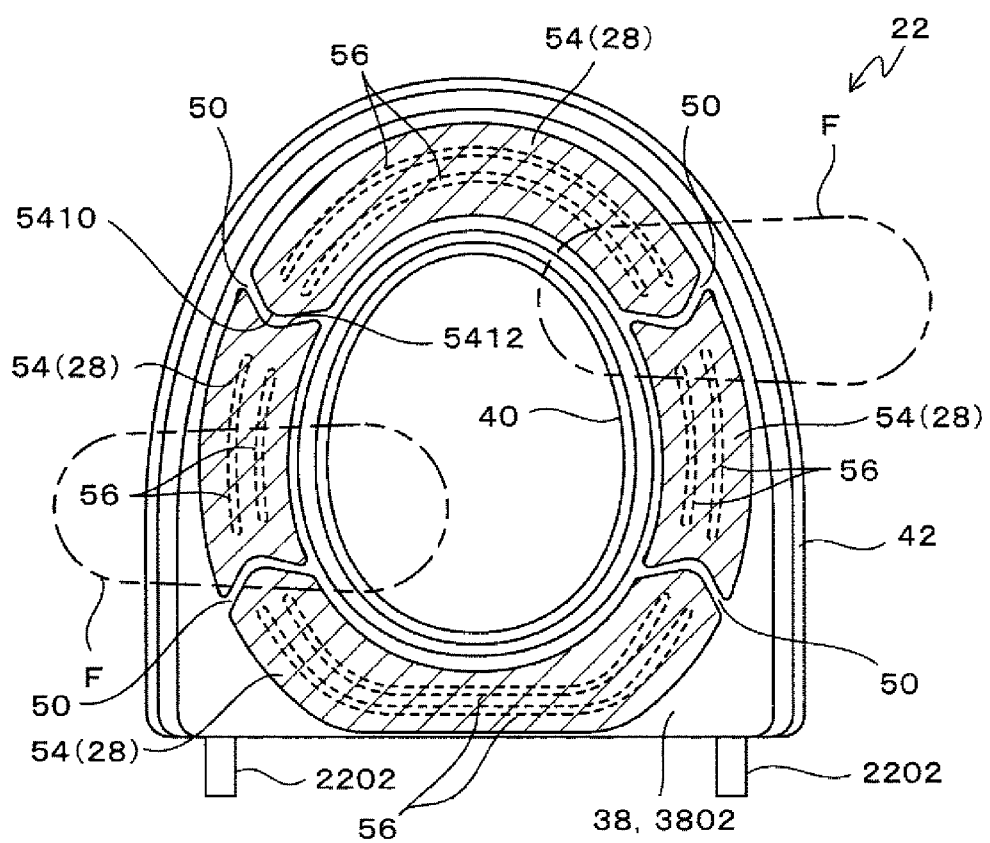
FIG. 17 is an explanatory diagram of a toilet seat according to the modified example of the third embodiment, which is seen from below.

In this case, as illustrated in FIGS. 16 and 17, in a state in which the divided band-like bodies 54 are attached to the lower surface 3802 of the body plate portion 38, in a plan view, the recess/protrusion portions 56 are formed to have a dimension positioned inward of the contours of the divided band-like bodies 54, in other words, a dimension hidden in the divided band-like bodies 54.

According to this modified example, when the recessed grooves 3840, 5430 and the protrusions 5420, 3850 are engaged with each other, the positioning of the toilet seat cushion block 28 (the divided band-like bodies 54) with respect to the lower surface 3802 of the body plate portion 38 can be facilitated, which is advantageous in facilitating attachment work for the toilet seat cushion block 28 (the divided band-like body 54).

Further, the adhesion area of the toilet seat cushion block 28 with respect to the lower surface 3802 of the body plate portion 38 of the toilet seat 22 can be increased, and the structure in which the parts of the toilet seat cushion block 28 and the parts of the toilet seat 22 are mechanically engaged with each other is provided. Thus, at the time of stepping on the toilet seat 22 with a foot or sitting on the toilet seat 22, when a load is applied to the toilet seat 22 in the width direction in a state of sitting on the toilet seat 22, the load can also be received by, in addition to the adhesion surfaces between the body plate portion 38 and the toilet seat cushion block 28, the parts of the toilet seat cushion block 28 and the parts of the toilet seat 22, which are mechanically engaged with each other, which is advantageous in preventing the peeling off of the toilet seat cushion block 28 and improving the durability of the toilet seat cushion block 28.

Next, another modified example of the second embodiment and the third embodiment is described with reference to FIG. 18.

Figure 18:
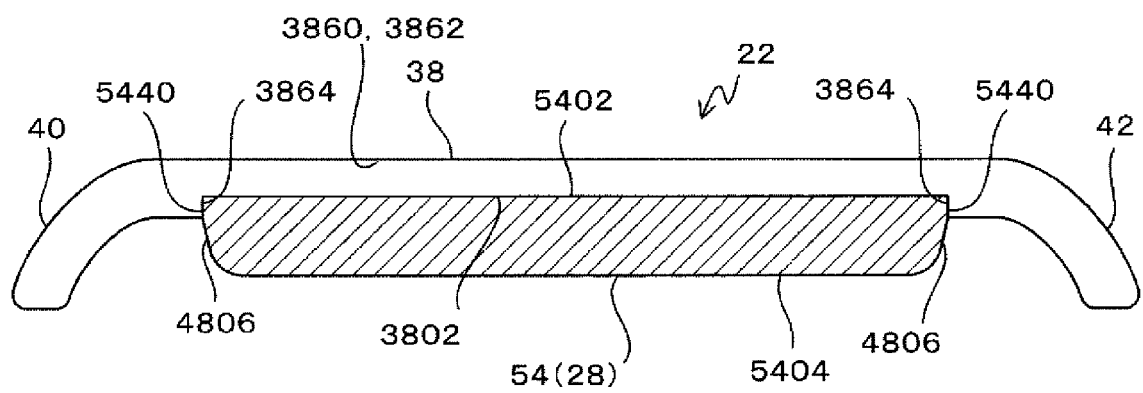
FIG. 18 is an explanatory diagram of another modified example of the second embodiment and the third embodiment.

In the modified example illustrated in FIG. 18, in the sections of the lower surface 3802 of the toilet seat 22 to which the divided band-like bodies 54 are attached, recess portions 3860 extending in the circumferential direction of the toilet seat 22 and opening downward are provided, and upper parts of the divided band-like bodies 54 are inserted therein.

The recess portions 3860 are formed to have a dimension that allows the upper parts of the divided band-like bodies 54 to be fitted therein without rattling.

Further, the upper surfaces 5402 of the upper parts of the divided band-like bodies 54 are attached to bottom surfaces 3862 of the recess portions 3860 with an adhesive, and entire circumferences of side surfaces 5440 of the upper parts of the divided band-like bodies 54 are attached to side surfaces 3864 of the recess portions 3860 with an adhesive.

According to this modified example, when the upper parts of the divided band-like bodies 54 are inserted in the recess portions 3860, the positioning of the divided band-like bodies 54 with respect to the lower surface 3802 of the body plate portion 38 can also be facilitated, which is advantageous in facilitating attachment work for the divided band-like bodies 54.

Further, the adhesion area of the toilet seat cushion block 28 with respect to the lower surface 3802 of the body plate portion 38 of the toilet seat 22 can be increased, and the structure in which the parts of the toilet seat cushion block 28 and the parts of the toilet seat 22 are mechanically engaged with each other is provided. Thus, at the time of stepping on the toilet seat 22 with a foot or sitting on the toilet seat 22, when a load is applied to the toilet seat 22 in the width direction in a state of sitting on the toilet seat 22, the load can also be received by, in addition to the adhesion surfaces between the body plate portion 38 and the toilet seat cushion block 28, the parts of the toilet seat cushion block 28 and the parts of the toilet seat 22, which are mechanically engaged with each other, which is advantageous in preventing the peeling off of the toilet seat cushion block 28 and improving the durability of the toilet seat cushion block 28.

The invention claimed is:

1. A toilet seat structure for an aircraft lavatory unit, comprising:
   a toilet body including a bowl portion;
   a support portion configured to support the toilet body above a floor;
   a shroud including:
   a peripheral wall portion configured to cover a periphery of the toilet body and the support portion and
   a flange having an annular plate shape and being placed on an upper end outer circumferential plate portion of the bowl portion;
   a toilet seat having an annular shape with a width and being placed on the flange;
   a shroud cushion block being attached on a lower surface of the flange facing the upper end outer circumference plate portion while securing an air communication passageway configured to communicate with an inside and an outside of the bowl portion; and
   a toilet seat cushion block being attached on a lower surface of the toilet seat facing the flange while securing an air communication passageway configured to communicate with the inside and the outside of the bowl portion, wherein
   the toilet seat cushion block has a band-like shape extending along a circumferential direction of the lower surface of the toilet seat and is positioned in substantially an entire area of the circumferential direction of the lower surface of the toilet seat while securing the air communication passageway at each of a plurality of sections at an interval in an extension direction of the toilet seat cushion block.

2. The toilet seat structure for an aircraft lavatory unit according to claim 1, wherein
   the toilet seat cushion block comprises:
   an inner band-like body having a band-like shape and extending at a section close to an inner circumference of the lower surface of the toilet seat; and
   an outer band-like body having a band-like shape and extending at a section close to an outer circumference of the lower surface of the toilet seat, the section being away from the inner band-like body in a width direction orthogonal to the circumferential direction of the toilet seat, and
   the air communication passageway comprises:
   a plurality of inner openings provided at an interval in an extension direction of the inner band-like body;
   an annular space between the inner band-like body and the outer band-like body; and
   a plurality of outer openings provided at an interval in an extension direction of the outer band-like body at sections of the outer band-like body, which are shifted from the plurality of inner openings in the circumferential direction of the toilet seat.

3. The toilet seat structure for an aircraft lavatory unit according to claim 2, wherein
   at a freely selected position in the circumferential direction of the toilet seat, any one of the inner band-like body and the outer band-like body is positioned in the width direction of the toilet seat.

4. The toilet seat structure for an aircraft lavatory unit according to claim 1, wherein
   the toilet seat cushion block comprises a plurality of divided band-like bodies being disposed at an interval in the circumferential direction of the toilet seat,
   the plurality of divided band-like bodies each have an elongated shape having a width along a width direction of the toilet seat and a length being larger than the width and extending along the circumferential direction of the toilet seat, and
   an interval between the plurality of divided band-like bodies in the circumferential direction of the toilet seat is smaller than the width.

5. The toilet seat structure for an aircraft lavatory unit according to claim 4, wherein
   of the plurality of divided band-like bodies that face each other in the circumferential direction of the toilet seat, one end is provided with a protrusion portion having a V-like shape, and another end is provided with a recess portion having a V-like shape,
   the protrusion portion of another divided band-like body is positioned inward of the recess portion of one divided band-like body of the plurality of divided band-like bodies adjacent to each other in the circumferential direction of the toilet seat,
   the air communication passageway is formed to have a V-like shape between the protrusion portion and the recess portion, and
   in a length direction of the plurality of divided band-like bodies, a top portion of the protrusion portion is positioned at a section shifted closer to the one divided band-like body with respect to top portions on both sides of the recess portion.

6. The toilet seat structure for an aircraft lavatory unit according to claim 5, wherein
   at a freely selected position in the circumferential direction of the toilet seat, the plurality of divided band-like bodies are positioned in the width direction of the toilet seat.

7. The toilet seat structure for an aircraft lavatory unit according to claim 1, wherein
   recess/protrusion portions are provided to the lower surface of the toilet seat and an upper surface of the toilet seat cushion block, which is attached to the lower surface, the recess/protrusion portions extending in the circumferential direction of the toilet seat and being engaged with each other.

8. The toilet seat structure for an aircraft lavatory unit according to claim 1, wherein
a recess portion extending in the circumferential direction of the toilet seat and opening downward is provided in the lower surface of the toilet seat, and an upper portion of the toilet seat cushion block is inserted therein, and
the lower surface of the toilet seat includes a bottom surface of the recess portion.

9. The toilet seat structure for an aircraft lavatory unit according to claim 3, wherein
recess/protrusion portions are provided to the lower surface of the toilet seat and an upper surface of the toilet seat cushion block, which is attached to the lower surface, the recess/protrusion portions extending in the circumferential direction of the toilet seat and being engaged with each other.

10. The toilet seat structure for an aircraft lavatory unit according to claim 3, wherein
a recess portion extending in the circumferential direction of the toilet seat and opening downward is provided in the lower surface of the toilet seat, and an upper portion of the toilet seat cushion block is inserted therein, and
the lower surface of the toilet seat includes a bottom surface of the recess portion.

11. The toilet seat structure for an aircraft lavatory unit according to claim 6, wherein
recess/protrusion portions are provided to the lower surface of the toilet seat and an upper surface of the toilet seat cushion block, which is attached to the lower surface, the recess/protrusion portions extending in the circumferential direction of the toilet seat and being engaged with each other.

12. The toilet seat structure for an aircraft lavatory unit according to claim 6, wherein
a recess portion extending in the circumferential direction of the toilet seat and opening downward is provided in the lower surface of the toilet seat, and an upper portion of the toilet seat cushion block is inserted therein, and
the lower surface of the toilet seat includes a bottom surface of the recess portion.

\* \* \* \* \*